United States Patent [19]

Smith

[11] Patent Number: 4,804,433

[45] Date of Patent: Feb. 14, 1989

[54] SYSTEM FOR CURING ADHESIVE IN THE MANUFACTURE OF TRANSDUCERS

[75] Inventor: Lawrence J. Smith, Darien, Conn.

[73] Assignee: Pitney Bowes Inc., Stamford, Conn.

[21] Appl. No.: 80,361

[22] Filed: Jul. 31, 1987

Related U.S. Application Data

[62] Division of Ser. No. 787,346, Oct. 15, 1985, Pat. No. 4,705,587.

[51] Int. Cl.$^4$ .................. B32B 31/00; B30B 5/02; G05G 15/00
[52] U.S. Cl. .................. 156/359; 156/378; 156/583.2; 269/54.1; 269/254 CS
[58] Field of Search .......... 269/228, 254 R, 254 CS, 269/54.1, 54.5, 134, 158, 159, 317; 156/539, 583.1, 583.6, 583.91, 583.2, 359, 540, 541, 579, 580, 378; 100/38, 93 P; 29/609, 610 SG

[56] References Cited

U.S. PATENT DOCUMENTS

| | | | |
|---|---|---|---|
| 2,588,745 | 3/1952 | McKenzie | 269/228 |
| 3,752,466 | 8/1973 | Johnson | 269/228 |
| 3,960,069 | 6/1976 | Bowyer | 100/93 P |
| 4,063,985 | 12/1977 | Kyts | 156/359 |
| 4,140,050 | 2/1979 | Giddings | 156/359 |
| 4,291,713 | 9/1981 | Frank | 156/359 |
| 4,311,549 | 1/1982 | Vercillo | 156/359 |
| 4,365,547 | 12/1982 | McClure, Jr. | 156/359 |
| 4,490,205 | 12/1984 | Warhol | 156/359 |
| 4,559,101 | 12/1985 | Long | 156/359 |
| 4,603,314 | 7/1986 | Fukunaga et al. | 29/609 |
| 4,665,754 | 5/1987 | Glenn et al. | 29/610 SG |

Primary Examiner—Michael W. Ball
Assistant Examiner—Louis Falasco
Attorney, Agent, or Firm—Peter Vrahotes; Melvin J. Scolnick; David E. Pitchenik

[57] ABSTRACT

A system for the curing of adhesive applied between a strain gauge and a transducer body. The method includes the steps of placing the transducer into contact with a fixed member, applying adhesive to a strain gauge and pressing the adhesive coated strain gauge on the transducer body while heating the fixed member. Heating is provided for by controlling the heat supplied to the fixed member so as to maintain the member at a predetermined temperature.

3 Claims, 9 Drawing Sheets

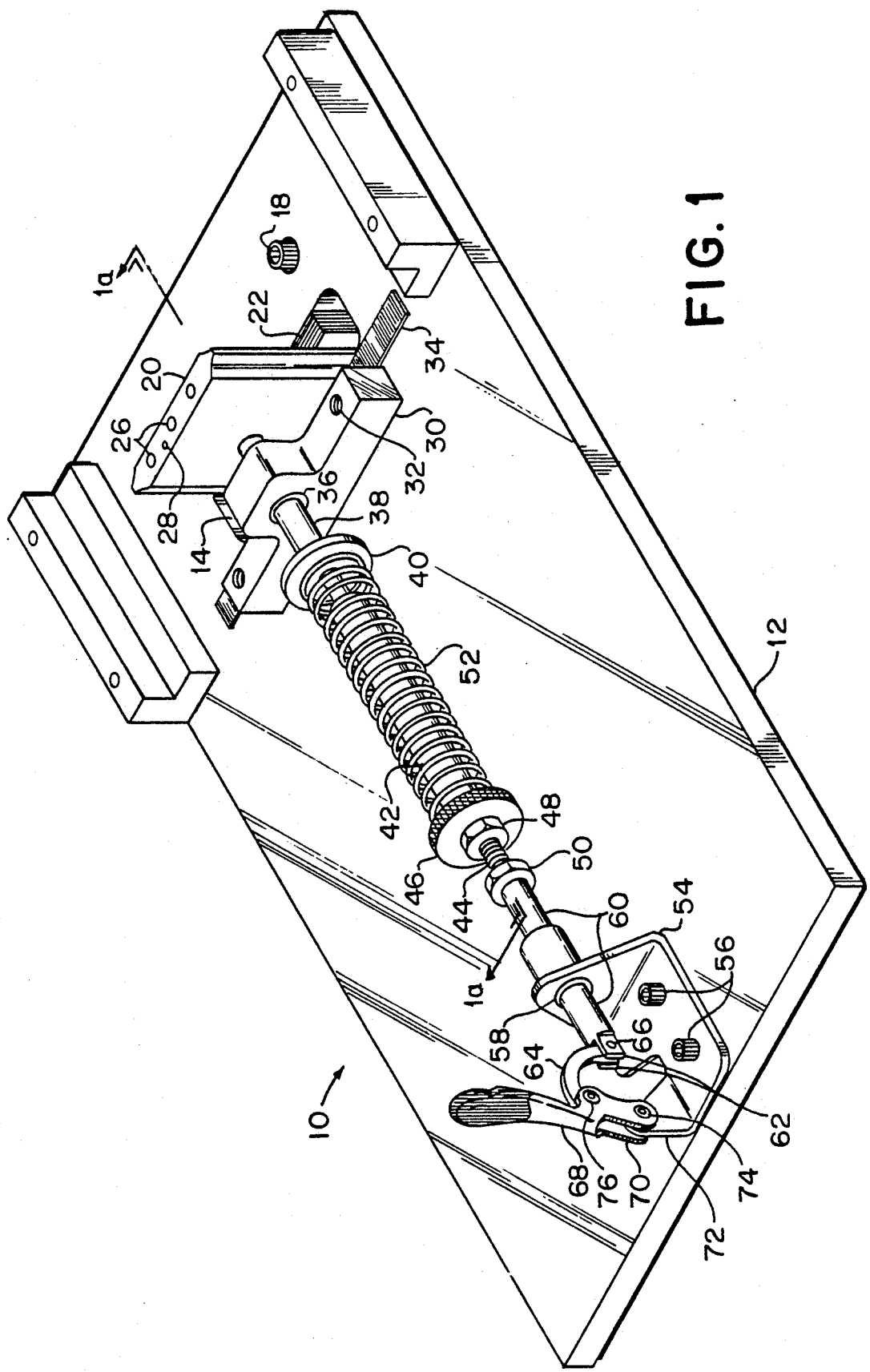

SYSTEM FOR CURING ADHESIVE IN THE MANUFACTURE OF TRANSDUCERS

This application is a division of U.S. Ser. No. 787,346 filed 10/15/85 now U.S. Pat. No. 4,705,587.

BACKGROUND OF THE INVENTION

In the fabrication of transducers, it is frequently necessary to join parts through the use of adhesive. An example of an application of such a transducer is a scale that utilizes a strain gauge for the purpose of measuring the deflection of a beam. The strain gauge must be attached to the beam in such a way that the deflection of the beam is accurately measured by the strain gauge. This requires that the strain gauge by firmly attached to the beam with a minimum of adhesive holding the strain gauge to the beam.

Prior art methods for curing adhesive for bonding a strain gauge to a beam involved applying adhesive to the strain gauge and attaching it to a beam and curing the adhesive. This was accomplished by mechanically clamping the strain gauge to the beam with the adhesive therebetween in a fixture and placing the fixture in a heating chamber which was then brought to the curing temperature of the adhesive. The quality of the transducer is materially affected by the bond line temperature, i.e. the temperature reached by the adhesive. Achieving the proper bond line temperature requires a considerable amount of time so that the temperature of the entire mass may be brought to the curing temperature relatively uniformly. In this scheme of curing, the entire fixture had to be heated.

As is known, it is difficult to control the temperature within a heating chamber, particularly when the heat is supplied by resistance heating. The heat from the atmosphere is transferred to the fixture and the bond line eventually reaches the desired temperature. The shortcoming of this method of curing the adhesive of a transducer is that furnaces, whether they be resistance furnaces or combustion furnaces, do not display either uniform increase in temperature or uniform temperature throughout the chamber. As a consequence, some of the transducers will achieve a proper curing of the adhesive while others will either by cured at too high or too low a temperature. The rate of heat rise also could be too high or too low. Furthermore, a large amount of energy is required in this mass method of curing for the small amount of material that is to be cured. A still further disadvantage is that only when a large number of transducers are being fabricated does the method approach any type of economic justification.

BRIEF DESCRIPTION OF THE INVENTION

A system has been conceived whereby the adhesive used in the bonding of transducer parts may be controlled so as to achieve maximum adherance at a lesser cost. This is accomplished by applying a strain gauge having an adhesive layer on the surface thereof against a transducer body and placing a resilient pad on the opposite side of the strain gauge. This assembly is then placed into a clamping device that is made up of a fixture that backs the transducer body and a shoe that engages the resilient pad with the strain gauge therebetween. The fixture contains heaters and a temperature sensor whereby heat may be applied to the transducer body in a controlled fashion. One of the advantages of this scheme is that the resilient pad which previously acted as an insulator that kept heat away from the strain gauge now acts as an insulator to prevent heat loss and maintain uniform temperature of the adhesive layer.

BRIEF DESCRIPTION OF THE DRAWING

FIG. 1 is an isometric view of a clamping device with which the instant invention may be practiced;

DETAILED DESCRIPTION OF THE PREFERRED EMBODIMENT

Figure 1A:
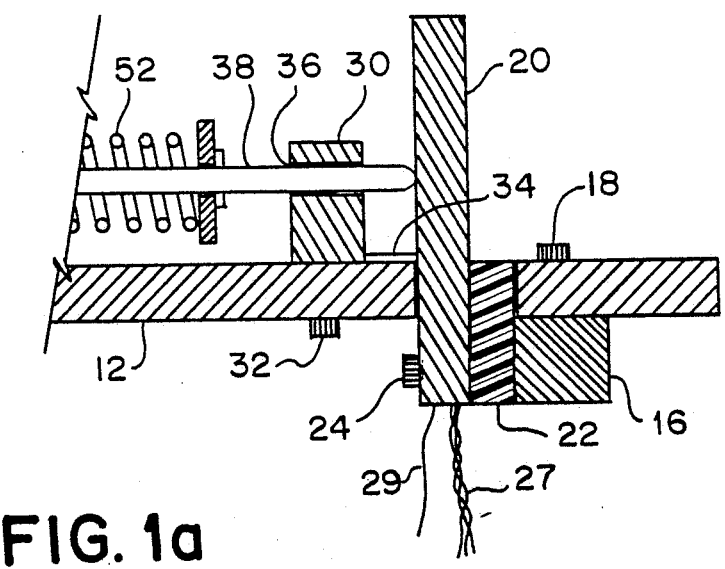
FIG. 1a is a cross-sectional view taken along the lines 1,1 of FIG. 1.

Referring now to FIGS. 1 and 1a, a clamping device is shown generally at 10 and includes a base 12 having an opening 14 therein. A block 16 is secured to the base 12 as by bolts 18 (only one being shown) adjacent to the opening 14. A fixture 20 is received within the opening 14 as is an insulator 22 and the two are secured to the block 16 as by bolts 24 (only one being shown). The fixture 20 extends well above the base 12 and has electric heating elements 26 to which leads 27 are attached and a temperature sensing device 28, such as a thermocouple or thermistor, to which a lead 29 is attached. The fixture 20 is made of a material, such as stainless steel, with high thermal conductivity. The insulator 22 is made of an insulating material, such as phenolic or ceramic, that acts to reduce heat losses from the fixture 20.

Addressing the fixture 20 is a buttress 30 that is secured to the base 12 by bolts 32. A plank 34 may be first welded to the base 12 so as to assure alignment of the buttress 30. The buttress 30 has an opening 36 therein that receives a plunger 38. The plunger 38 has a collar 40 thereon and is partially received within a sleeve 42 that is attached to a threaded shaft 44. An internally threaded collar 46 is disposed upon the threaded shaft 44 as is a nut 48 that secures the position of the collar 46. Also disposed upon the threaded shaft 44 is a second nut 50. A spring 52 is disposed about the sleeve 42 and a portion of the plunger 38 intermediate the collars 40,46.

A bracket 54 is secured to the base 12 by bolts 56. The bracket 54 has an opening 58 therein with a cylindrical guide 59 integral therewith. A piston 60 is received within the guide 59 and extends through the opening 58. The piston 60 has a slotted end 62 that receives an arcuate arm 64. The arcuate arm 64 is supported within the slot 62 by a pin 66. A handle 68 has an elongated slot 70 that receives a projection 72 of the bracket 54. The handle 68 is pivotally mounted to the projection 72 by pin 74 and the arcuate arm 64 is pivotally supported by the handle by another pin 76. This construction allows the plunger 38 to be moved toward and away from the fixture 20 by pivoting the handle 68 in a clockwise or counter-clockwise direction, respectively. The plunger 38 will be locked when the handle 68 is in its maximum clockwise position.

Figure 2:
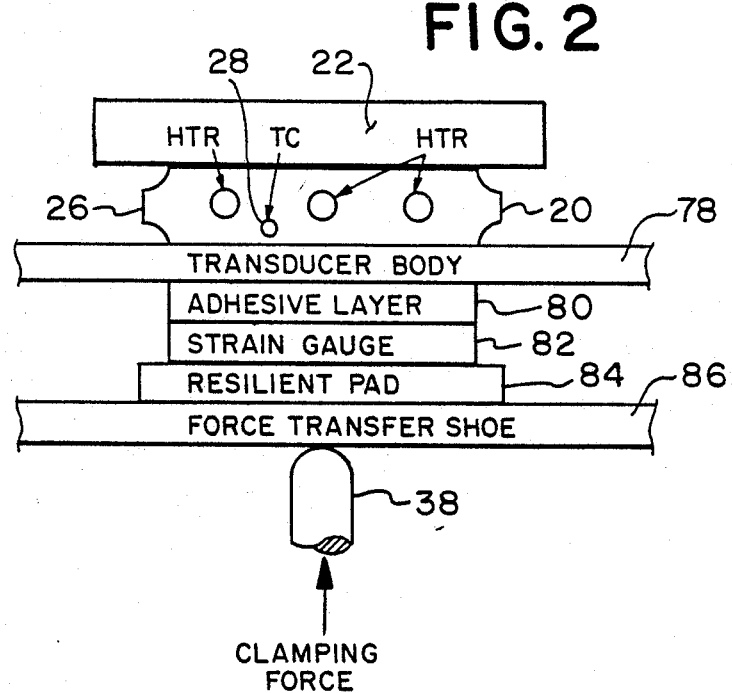
FIG. 2 is a cross-sectional view of a portion of the clamping device shown in FIG. 1 with a transducer assembly disposed therein.

Referring now to FIG. 2, a transducer body 78 to which a strain gauge is to be attached is placed next to the fixture 20. A layer of adhesive 80 is applied to the transducer body 78 and a strain gauge 82 is placed over the adhesive layer. A resilient pad 84 is located between the strain gauge 82 and a force transfer shoe 86. The plunger 38 is applied against the force transfer shoe 86 by movement of the handle 68 to its most clockwise position with a resilient force sufficiently great to hold the various components 78, 80, 82, 84 and 86 firmly against one another. The resilient holding by the plunger 38 is occasioned by the presence of the spring 52.

Figure 3:
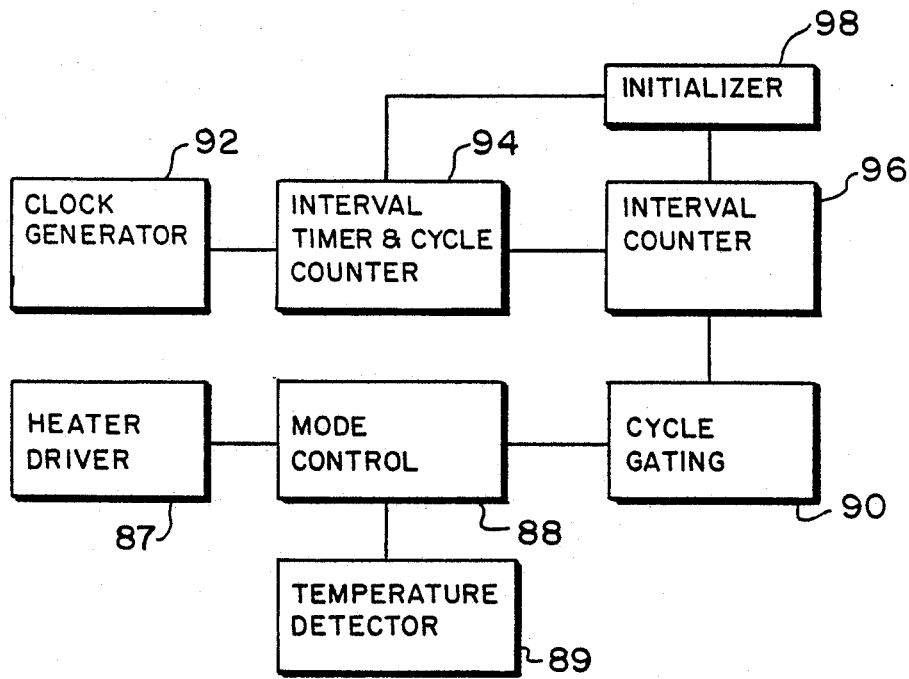
FIG. 3 is a block diagram of the circuitry used to supply and control heat to the assembly shown in FIG. 2.

Referring now to FIG. 3, a block diagram is shown of the circuitry used to control the heat applied to the fixture 10 so as to cure the adhesive layer 80 in what is believed to be the most advantageous manner. A temperature detector 89, which includes the temperature sensing device 28, is in electrical connection with a mode control unit 88 that may be a microprocessor such as an Intel 8085. The heating elements 26 are part of a heat driver 87 that is also connected to the mode control unit 88. In addition, a cycle gating unit 90 is in electrical connection with the mode control unit 88. Timing signals are generated by a clock generator 92 that is in connection with an interval timer and cycle counter 94. An interval counter 96 receives the output of the interval timer and cycle control unit 94 and is connected to an initializer 98. The interval counter 96 is connected to the cycle gating unit 90 so as to control the cycling of the system. The clock generator 92 generates a timing signal with every zero crossing of the cycle. The clock rate is preferably 120 hertz.

This timing signal is sent to the interval timer and cycle counter 94 that divides the line current into 32 segments. The cycle counter portion of the interval timer and cycle unit 94 counts from 1/32nd to 31/32nds, depending upon the adjustment, and determines the interval that is to be used. The interval counter 96 determines the status of the cycle counter 94 and selects the interval required. The initializer 98 is the start/stop controller and initializes the counters 94,96.

The cycle gating 90 controls the heating rate by sending the appropriate gate signal in terms of the segment to be applied. This gate signal is directed to the mode control unit 88 that acts upon the heater driver 87. The temperature detector 89 determines the temperature of the material and supplies the information to the mode control 88 so that the power supplied to the heater driver may be controlled after a predetermined temperature is attained. More specifically, when the temperature is reached for optimum curing of the adhesive layer, the power will be controlled to maintain this temperature within pre-set limits.

Figure 4:
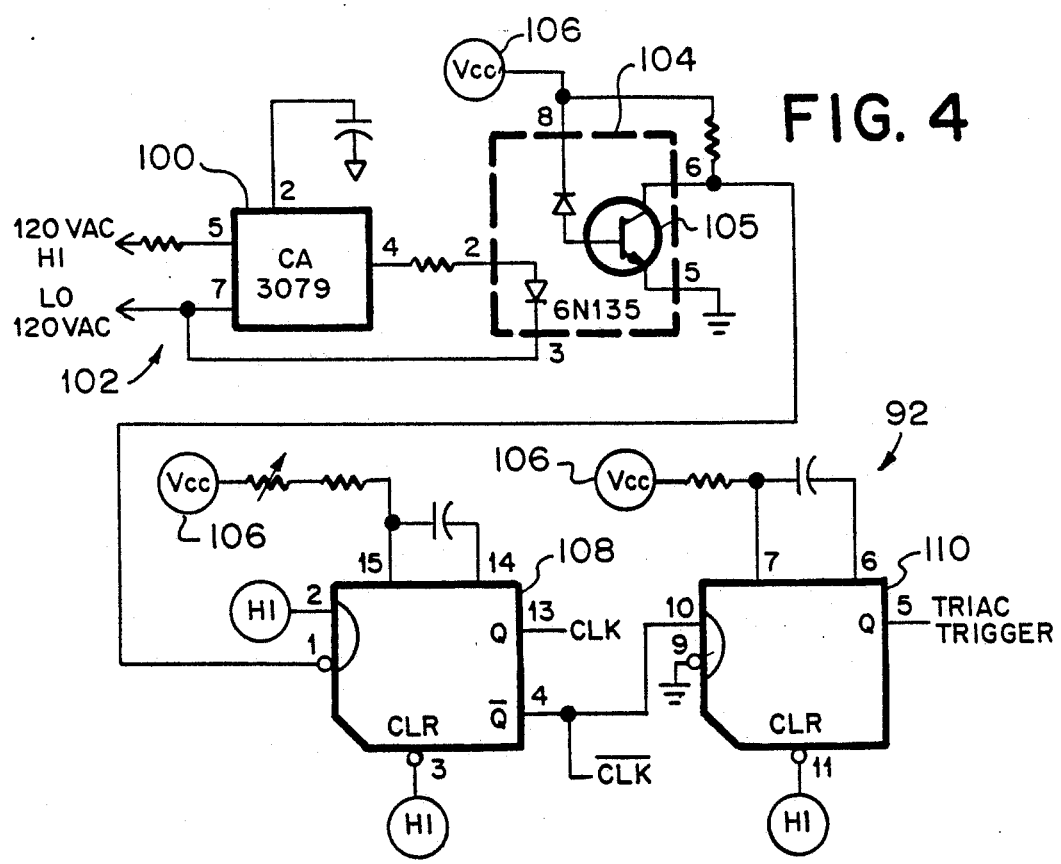
FIG. 4 is a schematic diagram of the clock generator shown in FIG. 3.

Referring now to FIG. 4, details are shown of the clock generator 92. A zero crossing detector 100 receives AC through lines 102 and sends a signal to an optocoupler 104. The output transistor 105 of the optocoupler 104 is in connection with the voltage source 106 and acts as a conditioner for the signal received from the zero crossing detector 100. A one shot multivibrator 108 receives the output of the transistor 105 to generate clock pulses CLK and $\overline{CLK}$ and is in contact with a one shot multivibrator 110.

Figure 5:
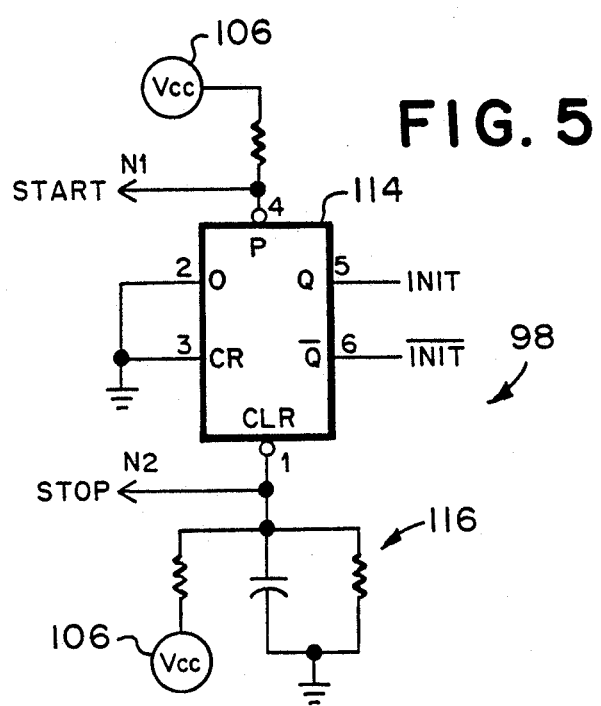
FIG. 5 is a schematic diagram of the initializing circuit shown in FIG. 3.

Referring now to FIG. 5, details will be given of the initializer 98 which includes a flip-flop 114 which is connected to the source of power 106. When power is first supplied, the flip-flop 114 is forced into the reset state by an R-C circuit 116. This results in INIT being low and $\overline{INIT}$ high; this sets the counters, shift registers and flip-flops to the state desired for non-operating condition. When the start line is brought low, the flip-flop changes state, INIT is high, $\overline{INIT}$ is low and the cycle starts. The cycle is stopped by an external stop switch that is either manual or activated by a timer.

Figure 6:
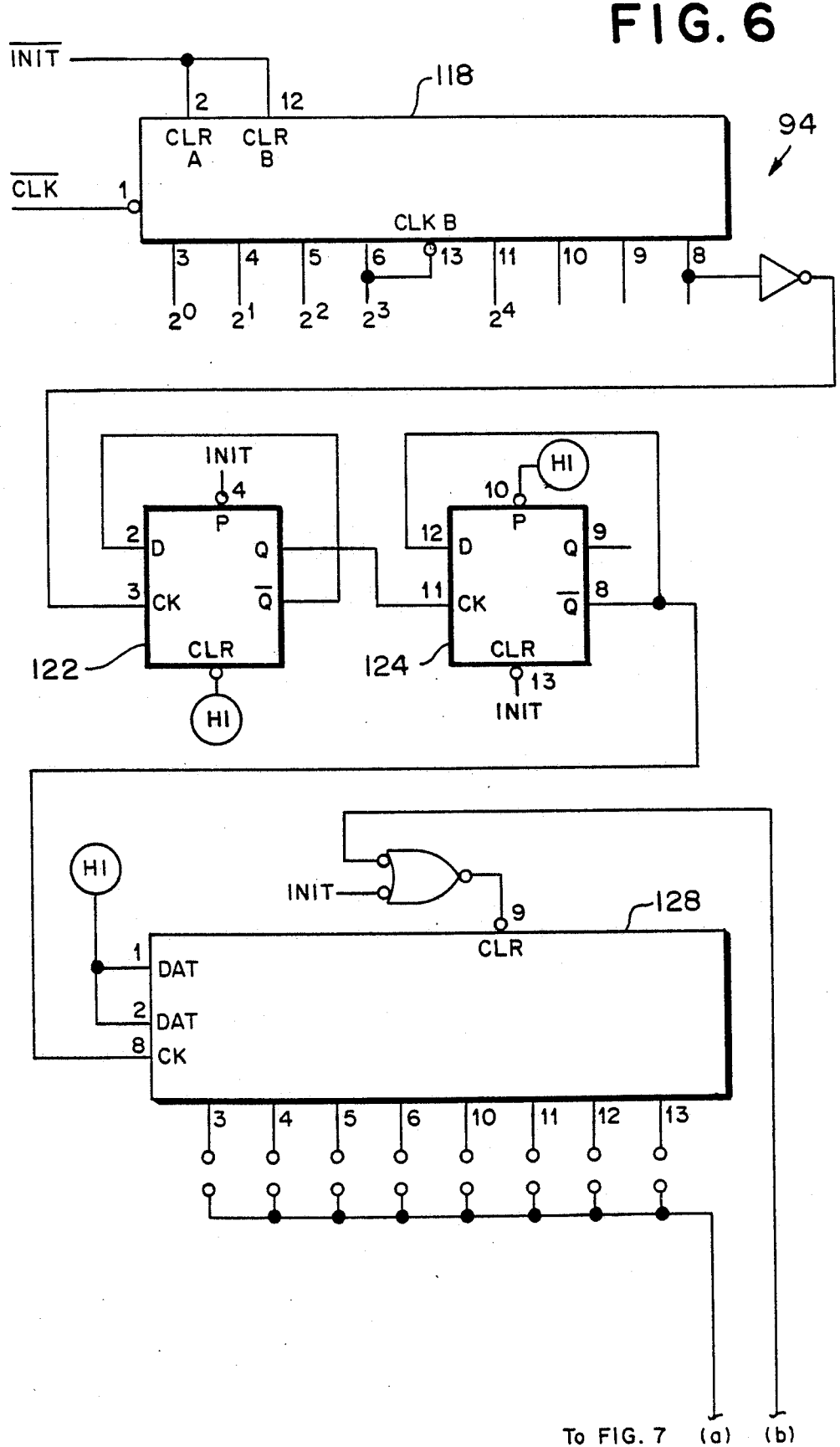
FIG. 6 is a schematic diagram of the interval timer and cycle counter of the system shown in FIG. 3.
Figure 7:
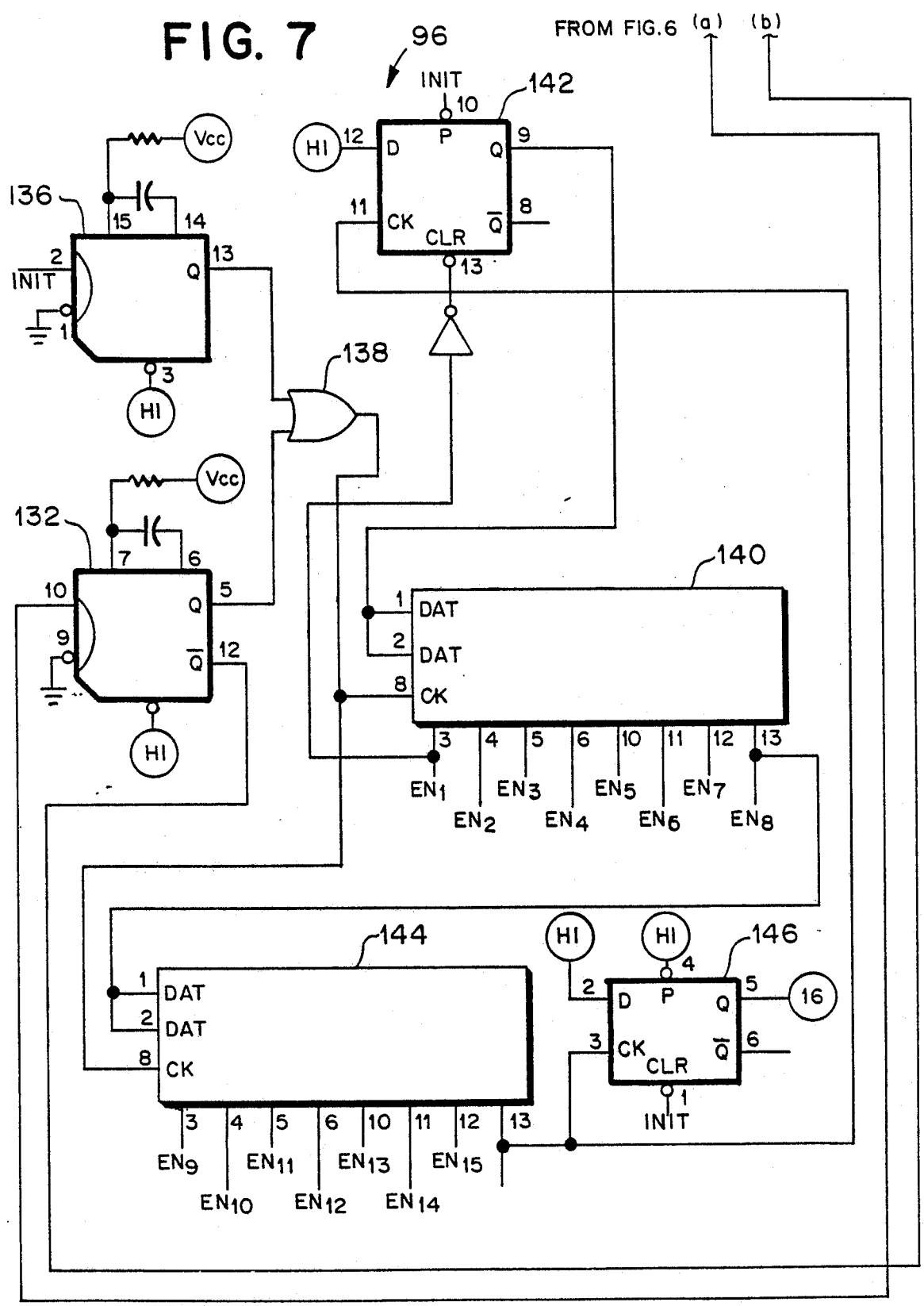
FIG. 7 is a schematic diagram of the interval counter shown in FIG. 3.

The output of the one shot multivibrator 108 is connected to the interval timer and cycle counter 94 to provide the clock signal as seen in FIG. 6. The clock output and the signal $\overline{INIT}$ from the initializer 98 are received by a shift register 118 which divides the cycle into 32 segments. The 32 segments are shown as $2^0, 2^1 \ldots 2^4$ which combinations will yield every segment from 1 to 32. The output of the shift register 118 is received by flip-flops 122 and 124 via an inverter 126. The shift register 118 and flip-flops 122 and 124 form an interval timer whose output drives a shift register 128. This shift register 128 is wired to allow one of its eight outputs to be brought to the input of a one shot multivibrator 132 (FIG. 7) which advances shift registers 140 and 144 to successive intervals. The Q outputs of a pair of one shot multivibrators 132,136 are connected to an OR gate 138 which connects to the inputs of the shift registers 140,144. The selected output of shift registers 140,144 determines the length of the interval for each power level. A flip-flop 142 initializes the shift registers 140,144 and another flip-flop 146 serves as an interval counter. These two flip-flops 142,146 allow half the number of segments to be processed in each cycle of the shift registers 140,144. The shift registers 140 and 144 will determine the segments 1–16 in the first cycle and are then used to determine the intervals 17 through 32 i.e. 16+1, 16+2, etc. in the next cycle.

Figure 8A:
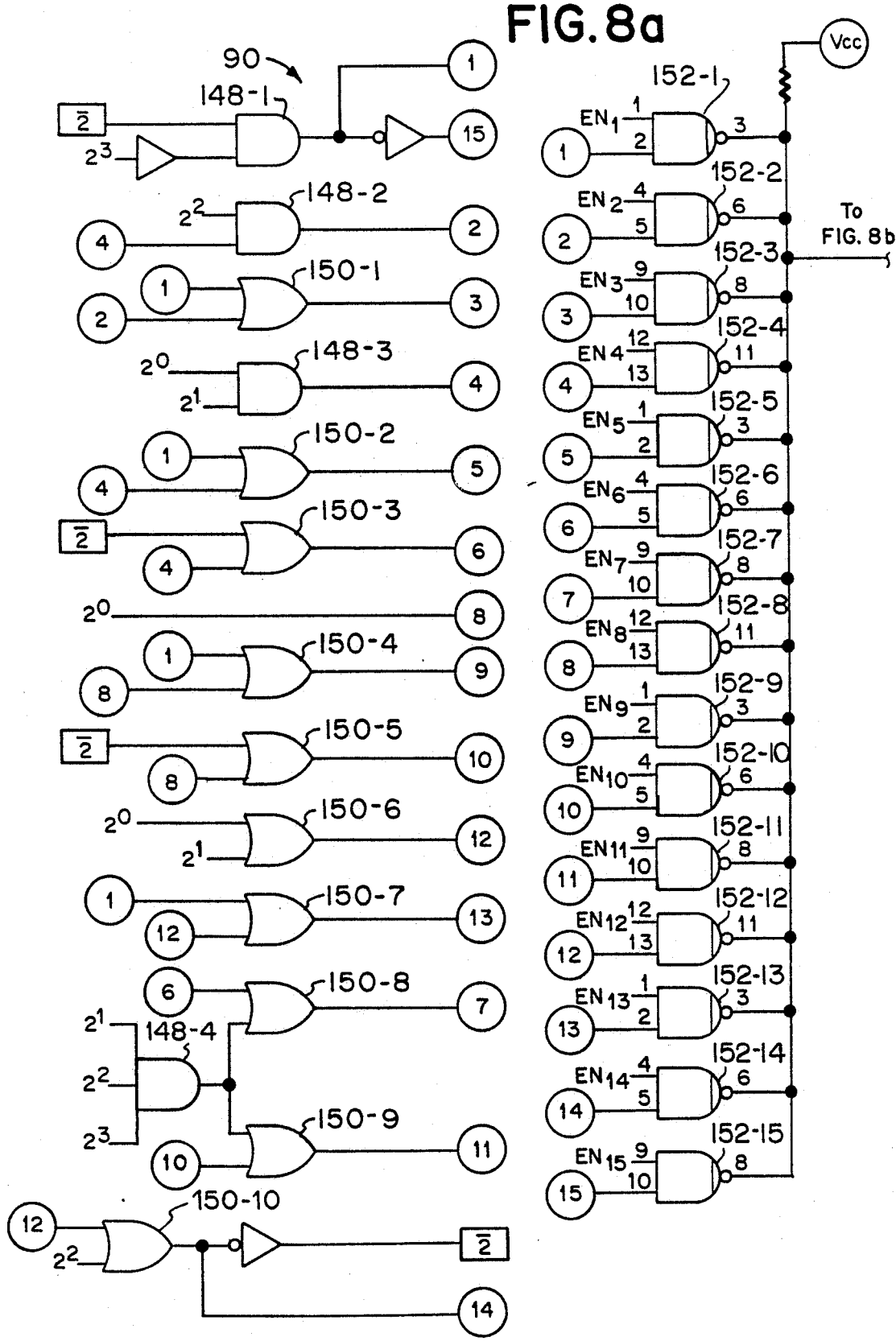
FIG. 8a is a schematic diagram of the cycle gating shown in FIG. 3.
Figure 8B:
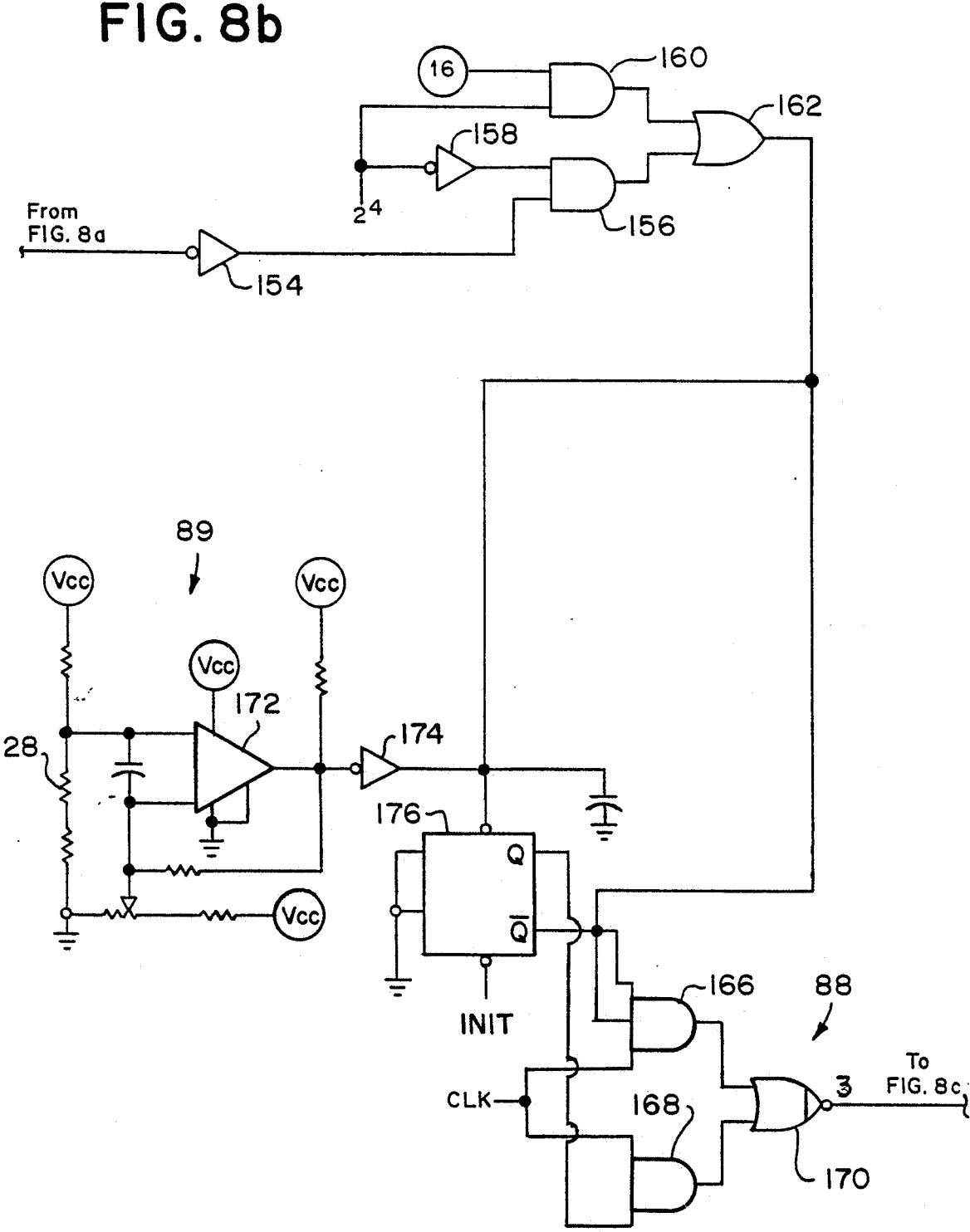
FIG. 8b shows the mode control and temperature detector shown in FIG. 3.
Figure 8C:
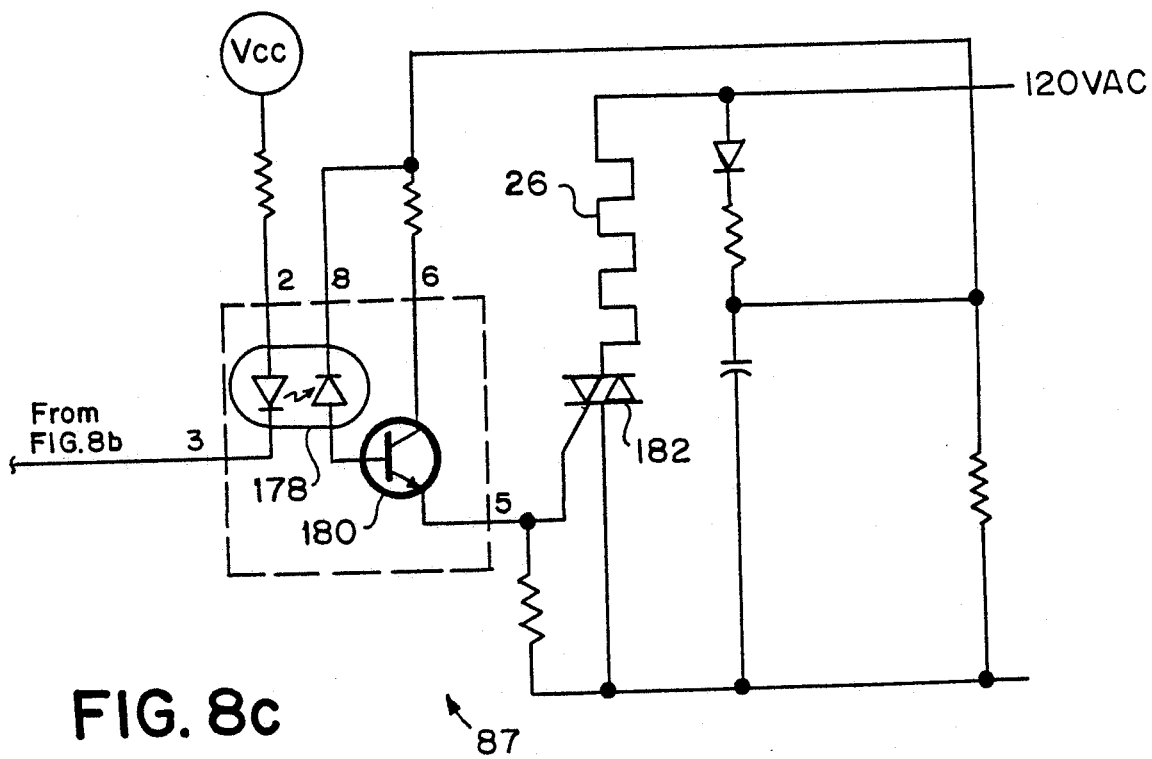
FIG. 8c is a schematic diagram of the heater driver shown in FIG. 3.

Referring now to FIG. 8, the cycle gating unit 90 includes a decoding circuit that is made up of a number of AND gates 148-1 to 148-4 and OR gates 150-1 to 150-10 that receive signals from the interval timer and cycle counter 94 and from self generated signals as indicated. The outputs from these AND gates 148-1 to 148-4 and OR gates 150-1 to 150-10 are supplied to NAND gates 152-1 to 152-15 as are timing signals $EN_1$ to $EN_{15}$, the appropriate signal from one of these NAND gates being supplied to an inverter 154. Receiving the output from the inverter 154 is an AND gate 156 that also receives the output at one of its terminals from another inverter 158 that receives the output of the $2^4$ pin of the shift register 118. The $2^4$ output of counter 118 is also in contact with another AND gate 160 that also receives the output from the Q pin of the flip-flop 146 of the interval counter 96. As a result of this construction, the AND gate 156 will only output a signal when one of the NAND gates 152-1 to 152-15 outputs a negative signal and the pin $2^4$ is low. When $2^4$ goes high, then the AND gate 160 will be enabled when in phase with the output from the flip-flop 146. The outputs from the AND gates 156,160 are connected to an OR gate 162.

The output of the OR gate 162 is received by the mode control unit 88 and the temperature detector 89. The mode control unit 88 is made up of a pair of AND gates 166,168 the outputs of which are connected to a NOR gate 170. The other inputs of the AND gates 166,168 are provided by the clock generator 92 and by the temperature detector 89. The temperature detector 89 includes the temperature sensing device 28 that is connected to an operational amplifier 172, the output of which is directed to an inverter 174. The output of the inverter 174 is connected to a terminal of a flip-flop 176 whose Q output is received by the AND gate 168 and whose $\overline{Q}$ output is received by the AND gate 166. The output from the NOR gate 170 is directed to an optocoupler 178 that is connected to an output transistor 180. The output transistor 180 is in connection with a triac 182 which in turn is connected to the heating elements 26.

Consequently, what is shown is a system wherein the temperature of the transducer body is measured by the temperature sensing device 28 and the temperature detector 89 sends a signal indicative of the temperature to a mode controller 88. After the predetermined temperature is reached, the temperature sending device will change the state of the flip-flop 176 and put the mode controller 88 into the mode control to control the cycle gating unit 90 which in conjunction with the interval time and cycle counter unit 94 will output time increments to the heater driver 87. These time increments will vary from 1/32nd to 31/32nds depending upon the temperature of the transducer body 78 and heat losses. In this way, an accurate temperature and length of heating cycle will be maintained. Preferably, the temperature of the transducer body 78 is maintained at 300° F.±5° F.

Figure 9:
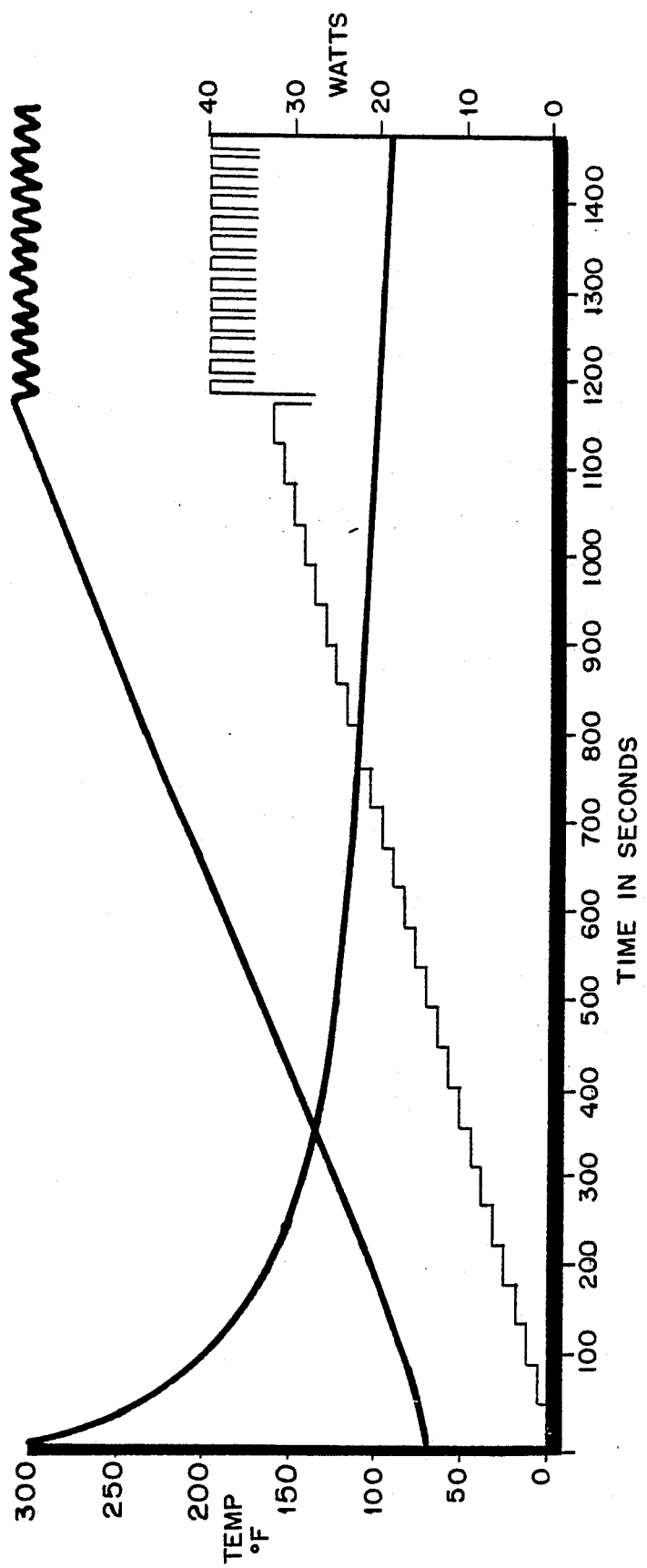
FIG. 9 is a graph showing the relationship between time and temperature of the curing cycle.

The relationship between time and temperature is shown in the graph of FIG. 9. The heating elements 26 are turned on by increasing the power incrementally. The incremental increase in power is continued until the temperature measured by the temperature detector reaches a selected level, in this case 300° F. The power is then applied in an interrupted fashion between full power and no power so as to maintain the temperature between approximately 290° F. to 320° F. The temperature will reach the curing temperature of approximately 300° F. in somewhat less than 30 minutes which is the preferred rate of heat rise. It has been found that this has resulted in a strong bond when this rate of heat rise if followed by a heating period of approximately five minutes. Thereafter, the power is turned off and the assembly will cool as shown in the graph.

What is claimed is:

1. A system for curing the adhesive bonding members of a transducer, comprising:
   a. a base;
   b. a fixture fixed to and supported by the base;
   c. electrical heating means received within said fixture;
   d. movable contact means supported by said base;
   e. means for moving said contact means toward and away from said fixture;
   f. means for locking said contact means at a predetermined distance from said fixture;
   g. means for measuring the temperature of said fixture; and
   h. means for controlling the heat supplied to the fixture after a predetermined temperature is attained by applying no power when the fixture is at the predetermined temperature and supplying full power when the temperature of the fixture decreases to a second predetermined temperature.

2. The system of claim 1 wherein said means for enabling said heating means does so by increments.

3. A system for curing the adhesive bonding between a transducer body and a strain gauge, comprising:
   a. a base;
   b. a fixture fixed to and supported by the base;
   c. electrical heating elements received within said fixture;
   d. holding means supported by said base;
   e. means for moving said holding means toward and away from said fixture;
   f. means for locking said holding means at a predetermined distance from said fixture;
   g. means for measuring the temperature of said fixture; and
   h. means for controlling the heat supplied to the fixture after a predetermined temperature is attained by applying no power when the fixture is at the predetermined temperature and supplying full power when the temperature of the fixture decreases to a second predetermined temperature.

* * * * *